(12) United States Patent
Subramanian

(10) Patent No.: US 7,957,391 B1
(45) Date of Patent: Jun. 7, 2011

(54) LOW OVERHEAD AGGREGATION AT THE PHYSICAL LAYER

(75) Inventor: Krishnamurthy Subramanian, Mountain View, CA (US)

(73) Assignee: Force 10 Networks, Inc, San Jose, CA (US)

( * ) Notice: Subject to any disclaimer, the term of this patent is extended or adjusted under 35 U.S.C. 154(b) by 144 days.

(21) Appl. No.: 12/284,809

(22) Filed: Sep. 25, 2008

Related U.S. Application Data

(60) Provisional application No. 60/995,166, filed on Sep. 25, 2007.

(51) Int. Cl.
*H04L 12/28* (2006.01)
(52) U.S. Cl. .................... 370/394; 370/395.1
(58) Field of Classification Search .............. None
See application file for complete search history.

(56) References Cited

U.S. PATENT DOCUMENTS

| | | | | |
|---|---|---|---|---|
| 6,081,523 A * | 6/2000 | Merchant et al. | ............ | 370/389 |
| 7,593,431 B1 * | 9/2009 | Lo et al. | ............ | 370/528 |
| 7,693,226 B1 * | 4/2010 | Lo | ............ | 375/260 |
| 7,701,957 B1 * | 4/2010 | Bicknell | ............ | 370/419 |
| 2001/0034729 A1 * | 10/2001 | Azadet et al. | ............ | 707/1 |
| 2004/0264511 A1 * | 12/2004 | Futch et al. | ............ | 370/535 |
| 2005/0102419 A1 * | 5/2005 | Popescu et al. | ............ | 709/238 |
| 2006/0268997 A1 * | 11/2006 | Thaler | ............ | 375/242 |
| 2007/0242745 A1 * | 10/2007 | Choi et al. | ............ | 375/240 |

* cited by examiner

*Primary Examiner* — Hong Cho
*Assistant Examiner* — Eunsook Choi
(74) *Attorney, Agent, or Firm* — Robert Schuler

(57) ABSTRACT

A physical layer device distributes a high-speed packet data stream to multiple lower-speed physical channels, and reverses the process to receive a high-speed packet data stream that has been distributed across multiple lower-speed physical channels. The packet data is distributed by removing interpacket gap characters from between packets and using a different control character to delineate packets. Interpacket gap characters can then be used to delineate equal-length frames distributed to each of the multiple physical channels. Each frame consists of a concatenation of fixed-size blocks of packet data. By selecting a frame size larger than the average packet size, overhead on the multiple physical channels can actually be lower than the overhead on the single high-speed channel, allowing the aggregation to achieve line rate operation at the high-speed rate.

12 Claims, 11 Drawing Sheets

US 7,957,391 B1

LOW OVERHEAD AGGREGATION AT THE PHYSICAL LAYER

CROSS-REFERENCE TO RELATED APPLICATIONS

This application claims priority to co-owned, co-pending U.S. Provisional Patent Application Ser. No. 60/995,166, filed Sep. 25, 2007, by Krishnamurthy Subramanian, entitled LOW OVERHEAD AGGREGATION AT THE PHYSICAL LAYER, which is incorporated herein by reference in its entirety.

BACKGROUND

1. Field of the Invention

The present disclosure relates generally to packet network media access controllers and physical layer devices, and more particularly to devices and methods for aggregating multiple physical layer devices into a logical channel.

2. Description of Related Art

In a packet network device, the physical layer (PHY) is the layer that actually formats/codes packet data for transmission across a physical medium, signals the data on that medium, senses received data from the medium, and interprets the sensed data to remove the physical layer formatting/coding. The physical medium may be an electrical cable, an optical fiber, or electromagnetic radio frequency propagation (i.e., wireless). For electrical cabling, several PHYs may share a common cable, with each PHY assigned to a dedicated wire pair or pairs within the cable. For optical fiber, several PHYs may send and receive data on the same fiber using wavelength division multiplexing (WDM), wherein each PHY modulates a laser at a different optical wavelength from the other PHYs, and the receiver incorporates optical demultiplexers and/or filters to separate the different wavelengths and supply them to different PHYs. Other packet network device peers may be linked by multiple PHYs, without all PHYs sharing a common cable or optical fiber.

When two packet network devices are connected by multiple physical links, whether on a single cable/fiber or multiple cables/fibers, it is sometimes advantageous to logically aggregate the multiple physical links, such that together the multiple physical links act as a single, higher-rate link. One method of accomplishing link aggregation has been promulgated by the Institute of Electrical and Electronic Engineers, e.g., in the IEEE 802.3-2005 standard, Clause 43 and Annexes 43A-C, incorporated herein by reference. This method parses transmit packets to, and merges receive packets from, multiple Media Access Controllers (MACs), each of which communicates with a corresponding PHY and physical channel. This method is useful with any MAC/PHY, but requires the link layer packet aggregation to implement multiplex and demultiplex buffers, link aggregation control protocol state machines and packet generators/interpreters, and sequencing logic to inspect packets and distribute them to the MACs in such a way that packets in the same stream will not be reordered (although the overall order of the packets may change from one end of the logical channel to the other, the order within each sender/receiver pair is preserved).

As an alternative to link-layer aggregation, it is also possible to aggregate links at the physical layer, by structuring a system so that a single MAC serves multiple PHYs. One such aggregation method is described in the IEEE 802.3-2005 standard, Clause 61, incorporated herein by reference. This method allows up to 32 Physical Medium Entities (PMEs) to interface with a PME Aggregation Function (PAF), where each entity is a 10 megabit/second (Mbit) or 2 Mbit PHY. The PAF, in turn, interfaces across a Media Independent Interface with a 100 Mbit MAC. The PAF fragments packets received from the MAC as it sees fit (within given restrictions) and distributes the fragments among the PMEs it controls. Each fragment begins with a fragment header containing a fragment sequence number, and start and end bits that indicate whether this is the first fragment of a packet, last fragment of a packet, or both. Data from the packet follows the fragment header, and a fragment checksum is calculated and appended to allow error detection.

A related, although slightly different, physical layer aggregation has been proposed for aggregating multiple 10 gigabit/second (Gbit) PHYs to a MAC running at a faster rate. This approach, termed Aggregation at the Physical Layer (APL), is illustrated in FIGS. 1 and 2. Whereas the Clause 61 approach operates with any 100 Mbit MAC and standard MAC/PHY interfaces using specialized PHY functionality, the APL approach uses specialized MAC functionality and standard MAC/PHY interfaces and PHYs. APL assumes that all underlying PHYs operate at the same data rate, while Clause 61 does not make this restriction.

FIG. 1 shows a functional block diagram of the APL approach. The MAC sublayer connects to the APL through a reconciliation sublayer (which maps signals from the APL to primitives understood by the MAC, and vice-versa). The APL fragments the packets and parses the fragments onto multiple 10 Gbit Media Independent Interfaces (XGMIIs).

Each XGMII connects to one of N 10 GBit PHYs, specifically to the Physical Coding Sublayer (PCS) of the PHYs, which in FIG. 1 are labeled PCS1, PCS2, . . . , PCSN. The PCS provides a uniform interface to the APL, provides coding/decoding needed for the physical channel, determines when the PHY is ready for use, etc.

Each PCS connects to a Physical Medium Attachment (PMA) sublayer, which in FIG. 1 are labeled PMA1, PMA2, . . . PMAN. Each PMA sublayer provides a medium-independent interface for the PCS, allowing the PCS to support different physical media. The PMA serializes/deserializes data streams and recovers the clock from the received data stream, for instance.

Each PMA connects to a Physical Medium Dependent (PMD) sublayer, which in FIG. 1 are labeled PMD1, PMD2, . . . , PMDN. The PMD sublayer transmits the serialized bitstream from the PMA according to the physical layer signaling format defined for that type of PMA, and receives a serialized bitstream from the media as well.

Each PMD connects to the physical medium through a Media Dependent Interface (MDI). Depending on the media type, there may be one MDI and one media for each PMD, or multiple PMDs may share an MDI and the attached medium.

FIG. 2 illustrates the operation of the APL for packet data received from the MAC. In FIG. 2, the MAC outputs an interpacket gap (IPG) consisting of idle characters, followed by a packet PA, another IPG, and then another packet PB. The APL takes this input, ignores the first IPG, and begins fragmenting packet PA. In the FIG. 2 example, packet PA is fragmented into eight maximum-length fragments (fragments 1-8) and eight smaller fragments (fragments 9-16). The fragments are distributed to the PCS sublayers of N PHYs (in this example N is 8) in round-robin order for transmission. Packet PB is then fragmented by the same process for transmission.

Each fragment is constructed in a format that makes it appear to a PCS as a packet. An IPG is supplied to the PCS before each fragment, followed by a start character, a set of fragment overhead bytes, a fragment of data from the current packet, and a terminate character.

The fragment overhead consists of a sequence number, a start bit S, an end bit E, and a fragment checksum. The sequence number increments sequentially as the APL creates fragments, and eventually rolls over. The size of the sequence number is designed to allow for unambiguous fragment reordering at the receiver with expected skew between PHYs. The start bit S is set if the fragment is the first fragment of a packet. The end bit E is set if the fragment is the last fragment of a packet. The fragment checksum is used to detect errors in the fragment overhead (it is assumed that the data portion of each fragment is adequately protected from errors by the packet checksum).

In the embodiment shown in FIG. 2, APL selected a smaller fragment size for the last eight fragments to divide the packet more equally and avoid transmitting partially-filled fragments, since the goal is to keep the rate of fragment transmission the same on all PHYs.

BRIEF DESCRIPTION OF THE DRAWINGS

The present invention can be best understood by reading the specification with reference to the following Figures, in which.

DETAILED DESCRIPTION

The prior art APL approach suffers from at least one significant shortcoming—because the APL fragments add idle characters and fragment overhead to every packet, the prior art APL approach is not a line rate solution. In other words, a 40 Gbit MAC cannot transmit packets at maximum rate to an APL sublayer that is fragmenting the packets and distributing them to four 10 Gbit PHYs.

In addition to this shortcoming, fragmentation adds a great deal of complexity to a sublayer that must process data at an extremely high rate. The APL sublayer must generate and interpret fragment checksums, arrange fragment sizes to accommodate different packet sizes and mixes, buffer fragments, order fragments and make decisions when fragments are late/missing in arriving, etc.

The present embodiments are presented as an alternative to the APL approach described above. In preferred embodiments, line rate traffic is accommodated by distributing packet data into large frames that are passed to each PCS. The frames require minimal overhead and can thus maintain line rate under almost any circumstances, generally with lower latency than the prior art APL approach.

Figure 1:
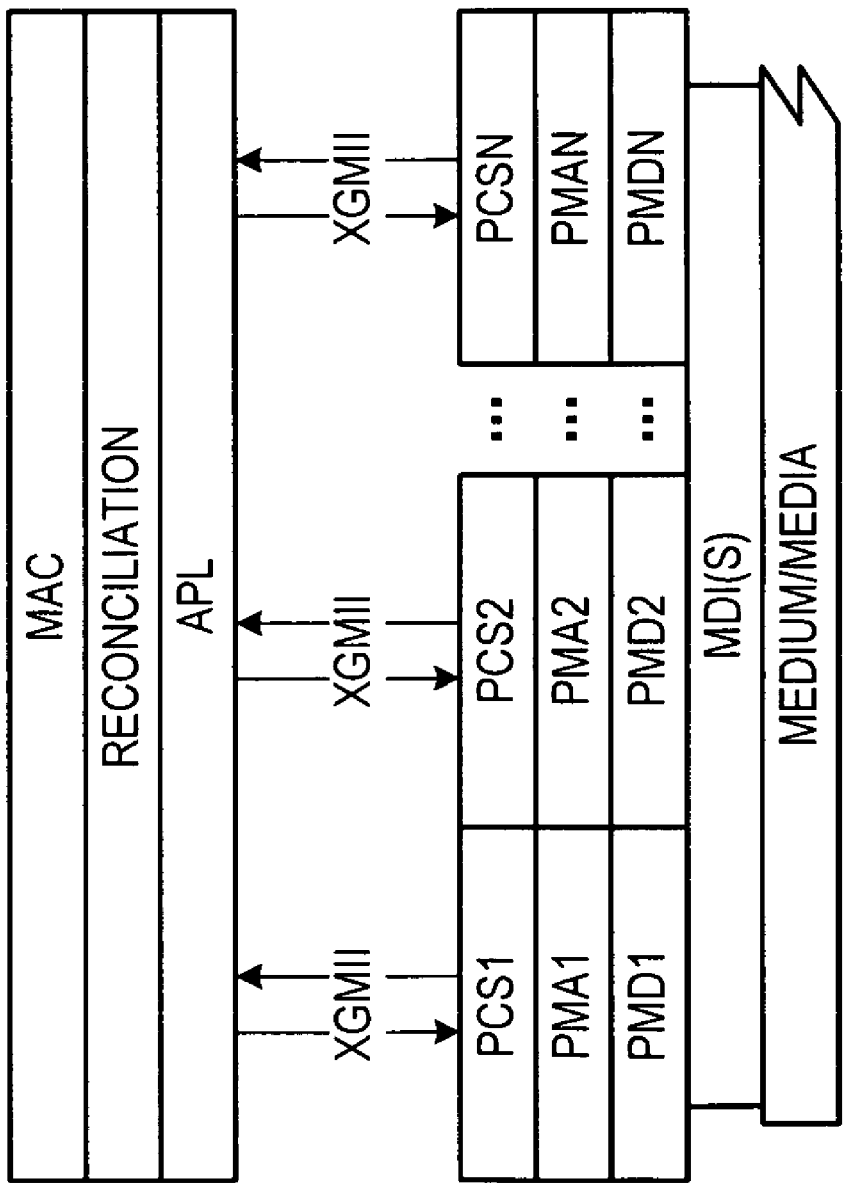
FIG. 1 illustrates a prior art MAC/PHY sublayer arrangement supporting Aggregation at the Physical Layer (APL)
Figure 2:
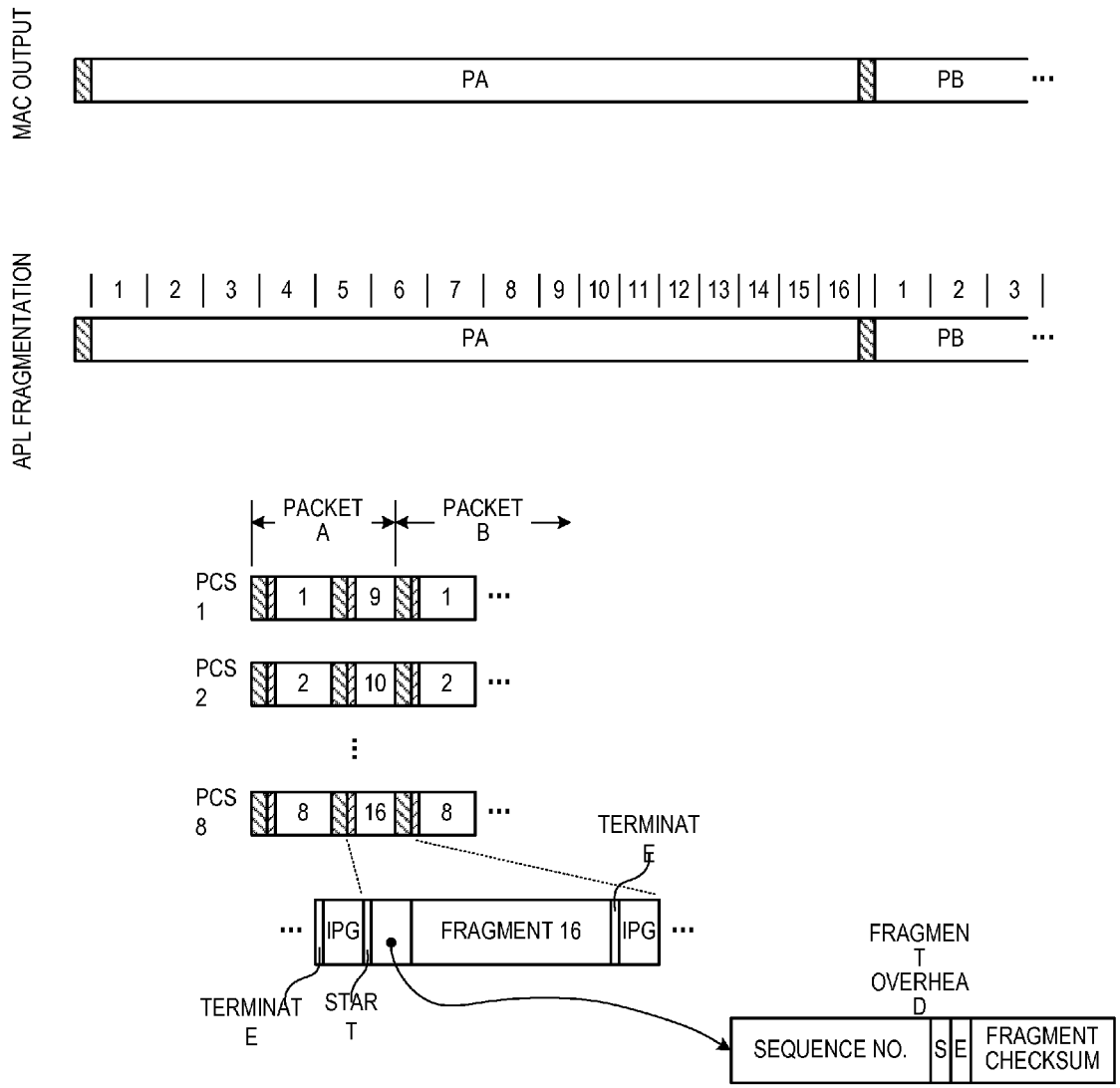
FIG. 2 contains an example of packet fragmentation according to a prior art APL approach.
Figure 3:
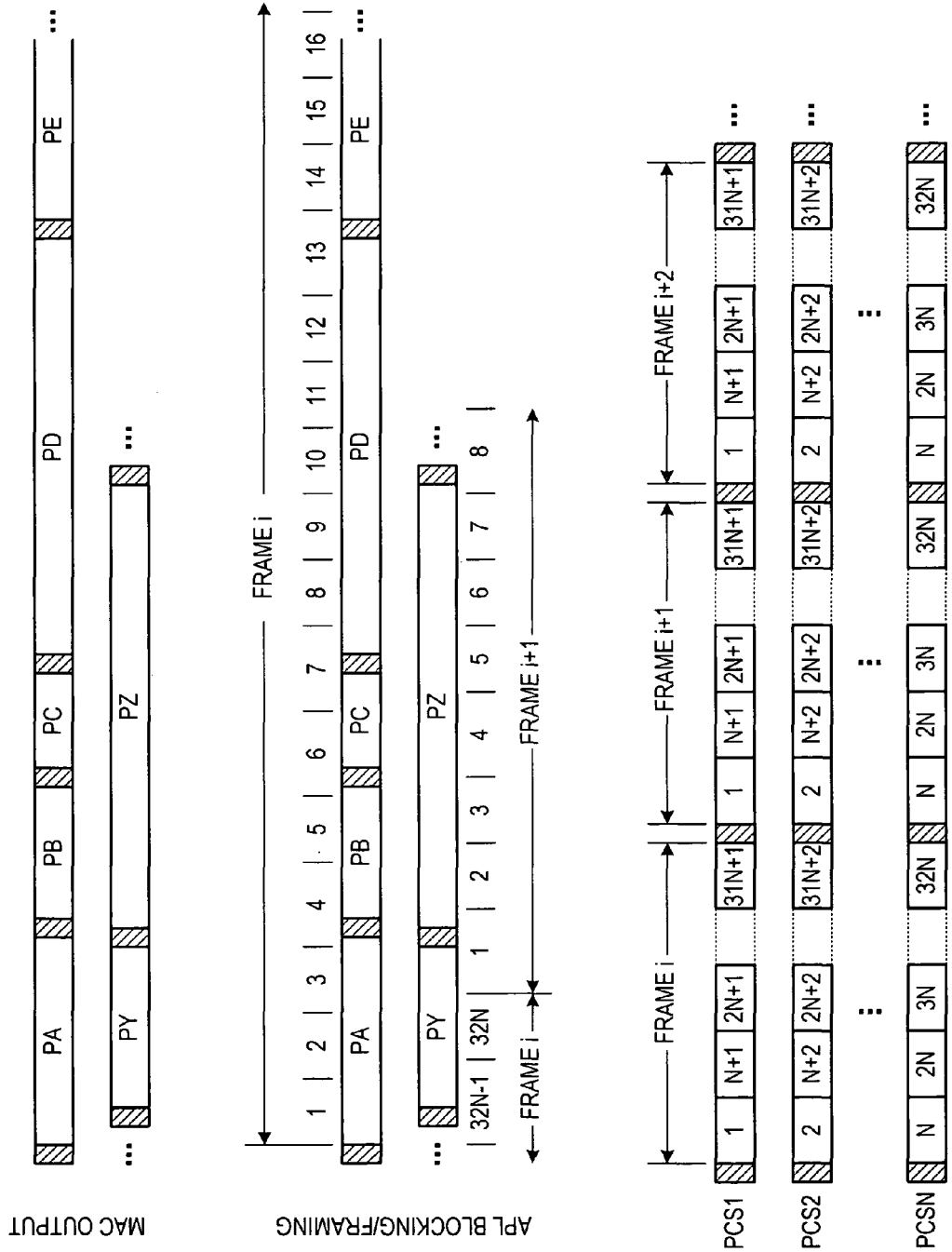
FIG. 3 contains an example of packet blocking/framing according to an embodiment, the embodiment presenting an alternative to the existing APL approach.

FIG. 3 illustrates operation of one embodiment in a typical line rate example. The MAC outputs a stream of packets PA, PB, PC, PD, PE, . . . , PY, PZ, . . . , separated by minimal IPGs. The APL blocks the packets into frames i, i+1, i+2, etc. (the frame numbering is used for understanding of the embodiment, and is not transmitted on the PHYs in this embodiment). Each frame is divided into 32N (32 is an exemplary number, others may be used) blocks, where N is equal to the number of PHYs in the aggregation). The blocks are distributed in round-robin fashion to the PHYs, with PCS1 receiving block 1, PCS2 receiving block 2, PCSN receiving block N, PCS1 receiving block N+1, etc. (the block numbering is used for understanding of the embodiment, and is not transmitted on the PHYs). All PCSs are sent their initial blocks of each frame at approximately the same time. After 32 block-times of data are transmitted to each PCS, a short IPG is transmitted on each PHY and the next frame is begun.

There is no requirement that a block contain data from a single packet. As shown in FIG. 3, the APL blocking/framing process places most of packet PA in blocks 1-3, but a small end portion of packet PA is combined with the beginning of packet PB in block 4. The IPG between packets PA and PB is discarded by the APL blocking/framing process. Blocks 6, 7, 13, and 32N−1 of frame i likewise span two packets.

Because the blocks sent to each PCS are of equal size and contain data only (in the view of the PHYs), there is no need to delimit them from each other in a PHY stream. Each PHY thus treats the frames it receives as long packets. In one embodiment, each block is 64 octets long, such that 32 concatenated blocks appear to a PHY as a single 2 kilobyte (KB) packet. As long as the average length of the packets submitted by the MAC does not exceed 2 KB, the APL can accept data from the MAC at line rate without exceeding the line rate of N underlying PHYs, each operating at 1/N times the line rate of the MAC.

Figure 4:
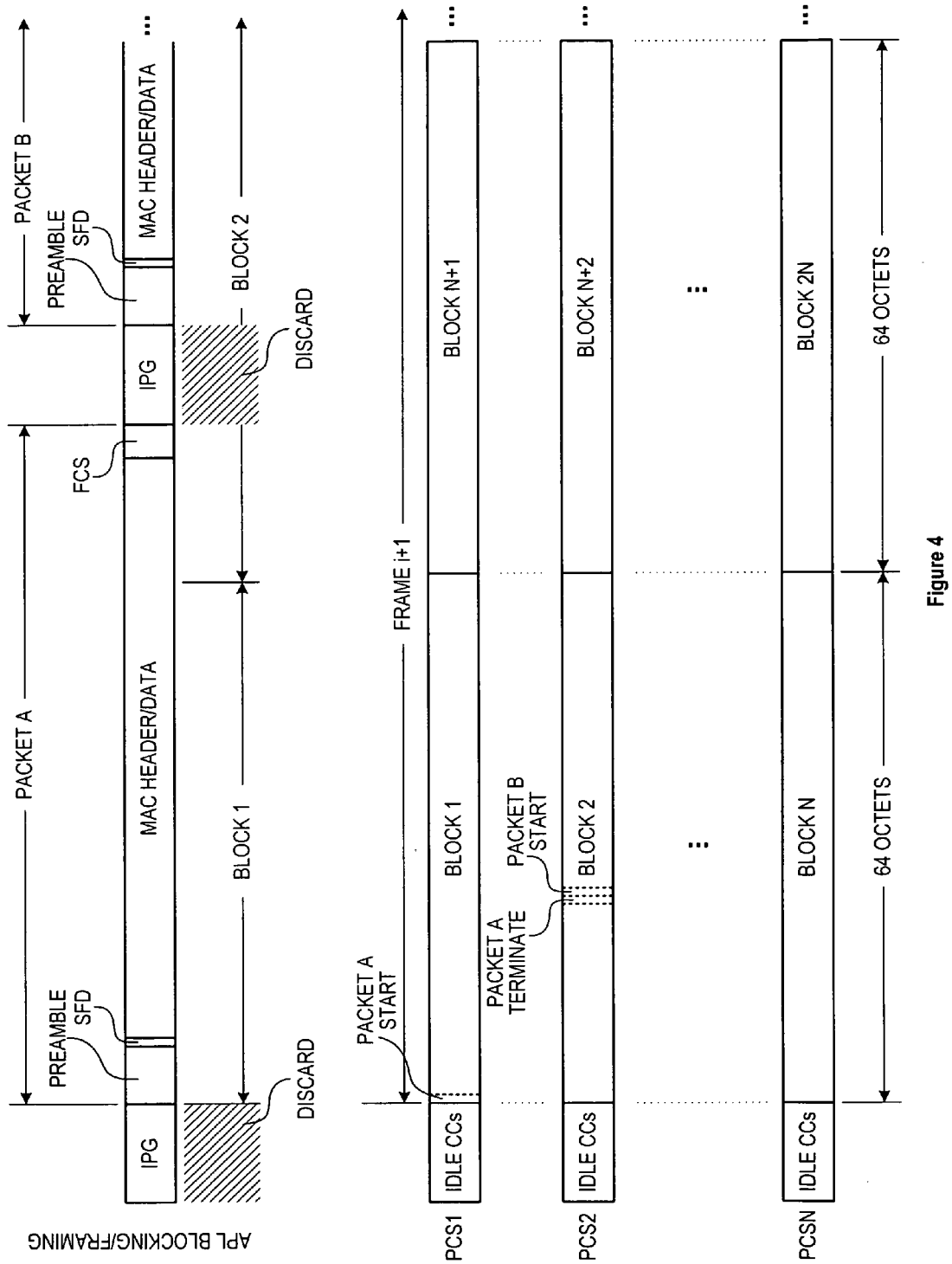
FIGS. 4 and 5 show further details of the FIG. 3 example, specifically focusing on transmission details at the start and at the end of a frame.

FIG. 4 illustrates additional details of the FIG. 3 embodiment, focusing on the behavior of the APL blocking/framing at the beginning of a frame that is aligned with the beginning of a packet (a packet A in this example). The APL process discards the IPG and begins forming a block 1. Block 1 comprises a start octet for packet A (generated by the APL by replacing the first preamble octet of packet A with a start character) followed by 63 additional octets from packet A, including the remainder of the preamble and start frame delimiter (SFD) and the following 56 octets of MAC header and data. Block 2 comprises the remainder of data from packet A, and the Frame Check Sequence (FCS) from packet A. As this data does not completely fill the 64 octets of data required for block 2, the APL inserts a termination control character for packet A in block 2, skips the following IPG from the MAC data stream, and continues filling block 2 with the preamble, SFD, and MAC header/data from packet B. Like with packet A, packet B has its first preamble octet replaced with a start control character. Note that although the packet A termination control character and packet B start control character are shown adjacent, in some implementations a start control character may be required to appear at a certain position, e.g., aligned to the first octet of a quad octet. In such an implementation, 0 to 3 idle characters may be inserted between the termination control character and start control character to meet this requirement.

Blocks 1 and 2 are "start blocks" because they follow a set of idle control characters placed in each PHY's data stream by the APL. In current 10 Gbit PHYs, a data stream may consist of packets, each no less than 64 octets long and no greater than 2048 octets long, with the packets separated by an IPG comprising at least 12 idle control characters. At the end of each frame, the APL simultaneously (or nearly so) supplies all N PHYs with at least 12 idle control characters, and then begins sending data. The initial data positions of each start block will be sensed at the receiver to align the data blocks appearing from the different PHYs and compensate for any skew appearing at the receiver.

After the start blocks, the APL simultaneously supplies each PHY with a second block of packet data (e.g., block N+1 for PCS1, block N+2 for PCS2, etc.). The second blocks each represent 64 octets of packet data from the MAC packet stream. This behavior continues in round-robin fashion until 32 blocks have been supplied to each PHY.

Figure 5:
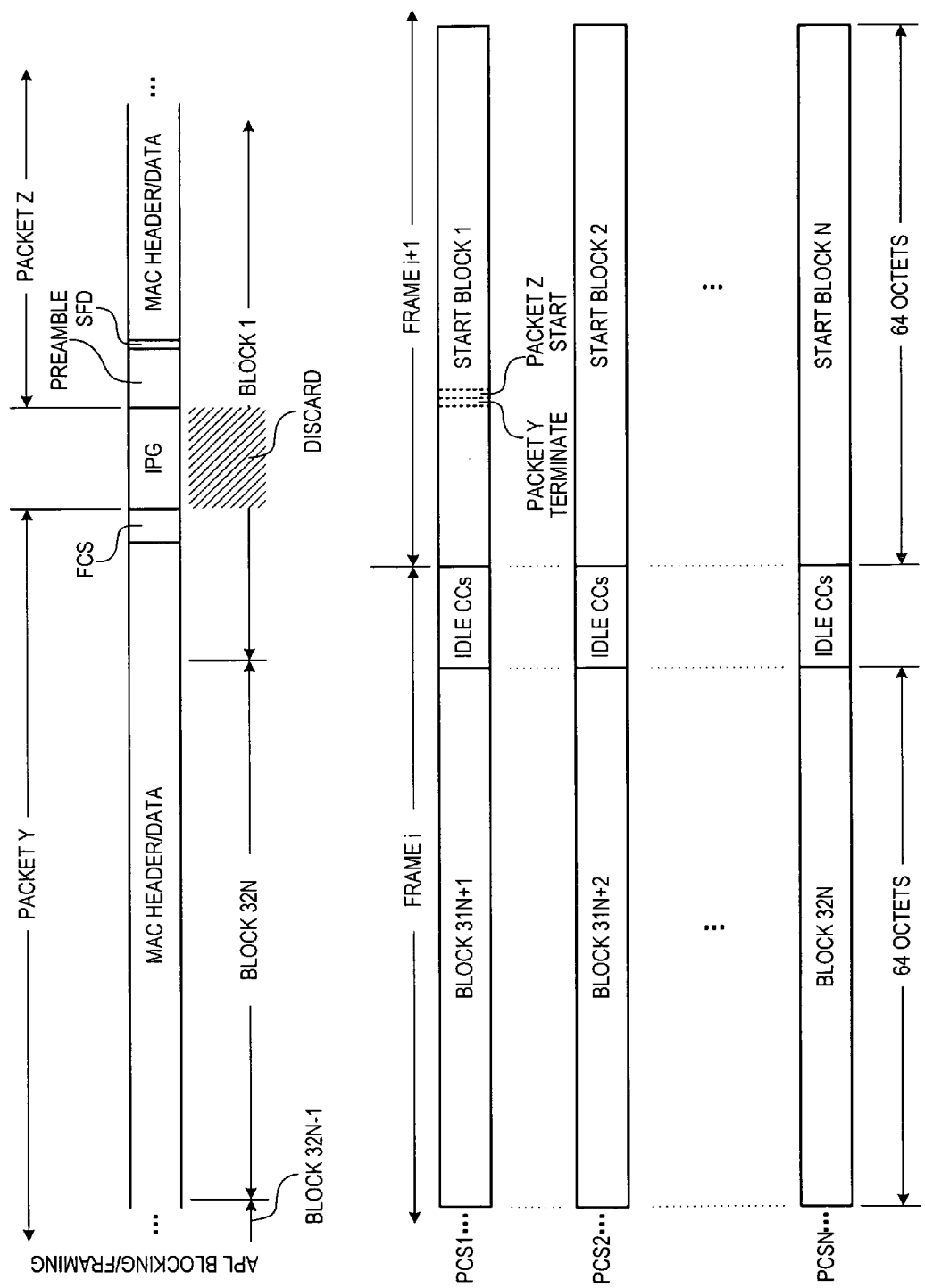

FIG. 5 illustrates additional details of the FIG. 3 embodiment, focusing on the behavior of the APL blocking/framing at the end of a frame and the beginning of a new frame that is not aligned with the beginning of a packet. A block 32N, taken from a packet Y, is supplied to PCSN, simultaneously with blocks 31N+1, 31N+2, . . . , 32N−1, supplied respectively to PCS1, PCS2, . . . , PCS(N−1). After the APL generates the $32^{nd}$ frame blocks for each PHY, it generates twelve idle control characters for each PHY. The APL then begins supplying each PHY with start blocks for the next frame. Thus PCS1 will receive a start block 1 comprising 64 octets of data, consisting of the remainder of the packet Y data, the packet Y FCS, a termination character for packet Y, the packet Z preamble (including a start control character) and SFD, and the beginning of the packet Z MAC header and data. The process continues as described above in conjunction with FIG. 4.

Figure 6:
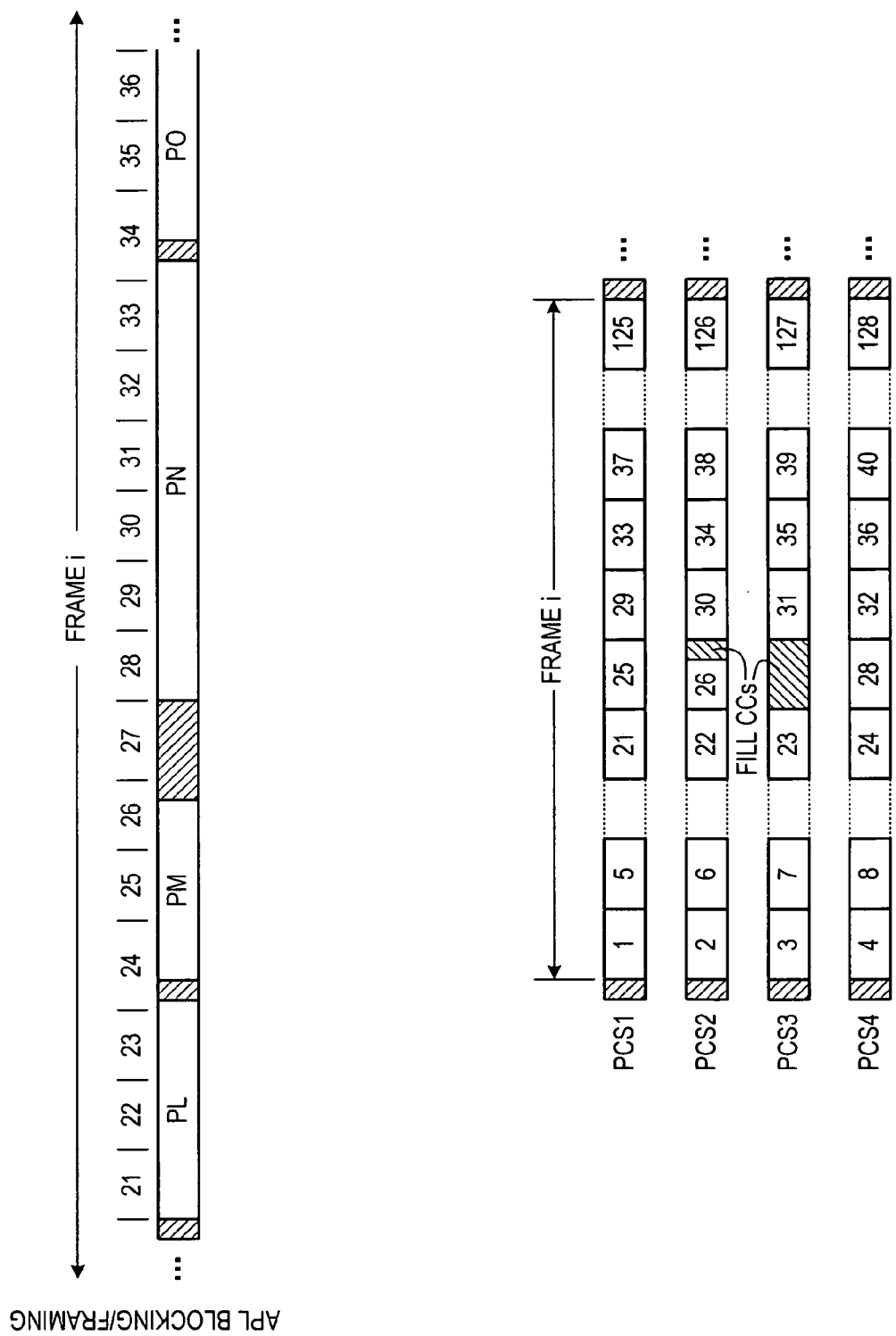
FIG. 6 contains an example of packet blocking/framing according to an embodiment, illustrating the ability in the embodiment to terminate and restart a frame in one or more PHYs to compensate for gaps in packet transmission.
Figure 7:
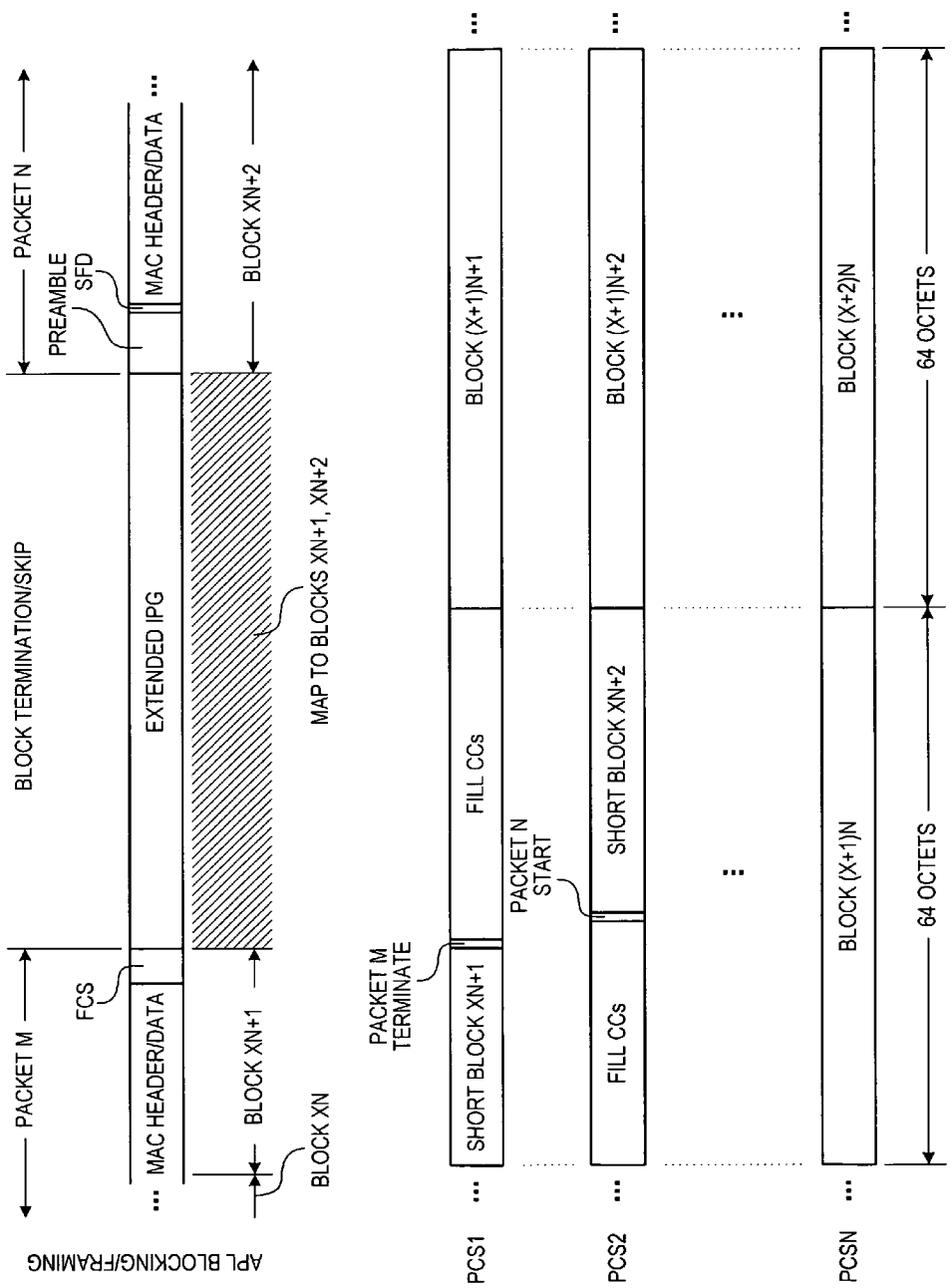
FIG. 7 shows further details of the FIG. 6 example.
Figure 8:
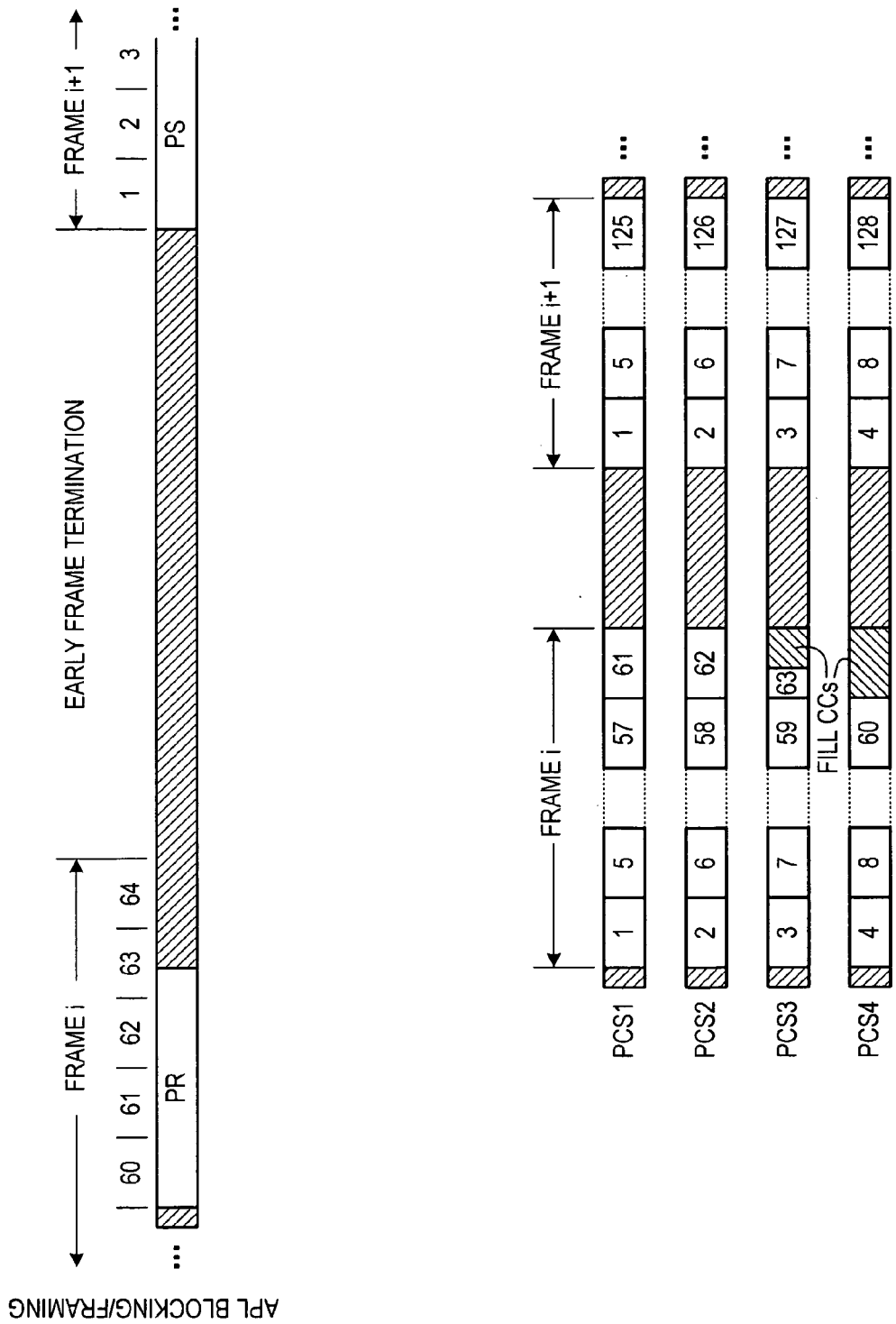
FIG. 8 contains an example of packet blocking/framing according to an embodiment, illustrating the ability in the embodiment to terminate all frames in all PHYs prior to them reaching their maximum length to compensate for large gaps in packet transmission.
Figure 9:
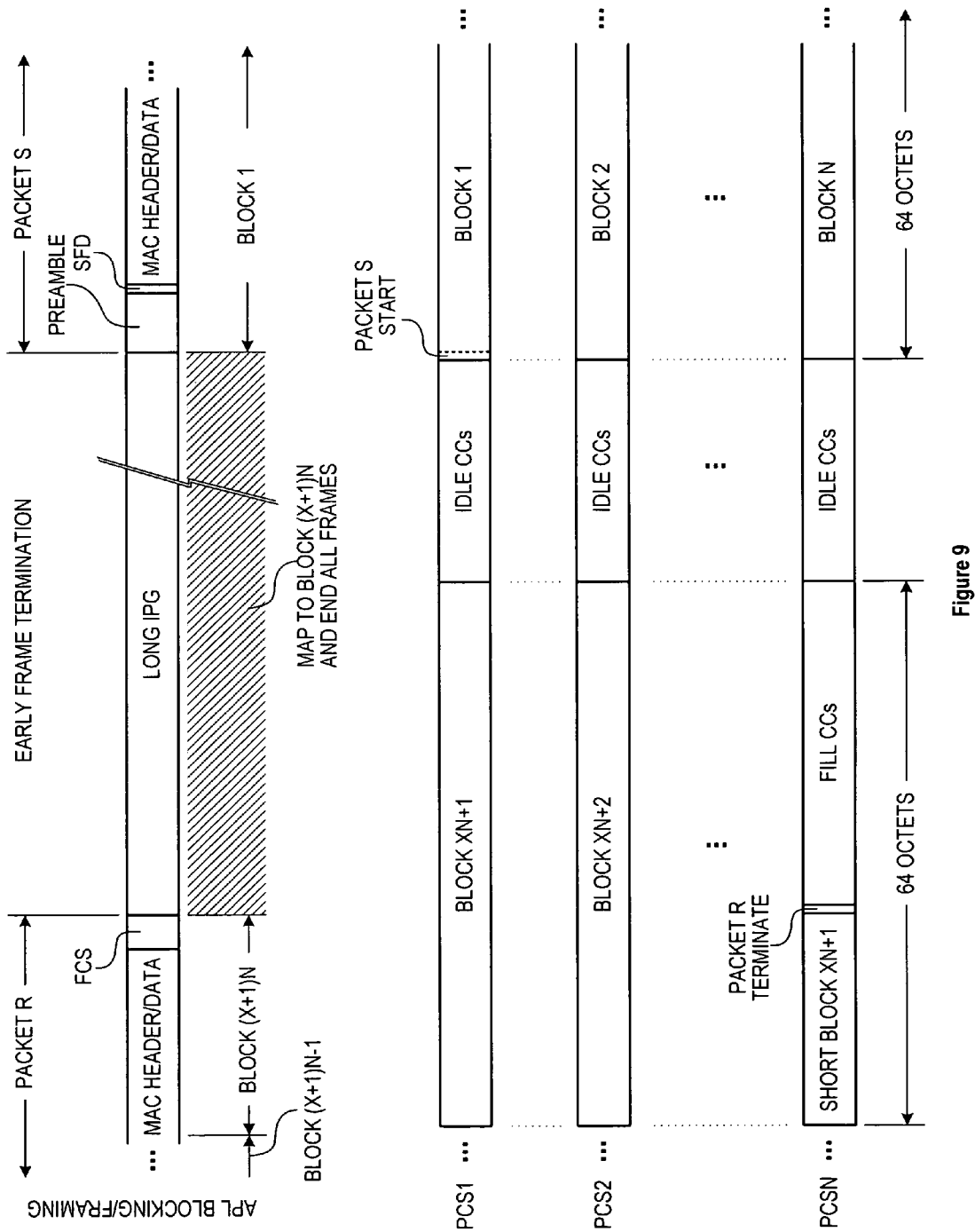
FIG. 9 shows further details of the FIG. 8 example.

When the MAC is operating at less than N times the line rate of the APL PHYs, or is transmitting packets with an average length less than 2 KB, the APL process described above in conjunction with FIGS. 3-5 produces fewer idle control characters than actually appear in the MAC data stream. This eventually will result in buffer underflow conditions in the APL and data starvation at the XGMII inputs to the PHYs, if not compensated by the APL. Two methods are presented below for injecting fill and/or idle control characters into the frame format of FIGS. 3-5 without disturbing the blocking relied on by the receiver. FIGS. 6 and 7 illustrate examples useful for compensating for small accumulations of idle character deficits in the APL. FIGS. 8 and 9 illustrate examples useful for compensating for large accumulations of idle character deficits in the APL.

FIG. 6 illustrates APL frame i blocking for four packets PL, PM, PN, PO, with the APL communicating with four PHY PCS units, PCS1 to PCS4. A relatively large IPG appears in the MAC packet stream, between packets PM and PN. Rather than making block 26 span packets PM and PN, the APL decides to terminate block 26 early (prior to 64 octets), and to place no data in block 27. The short block 26 is padded with fill control characters and supplied to PCS2. The empty block 27 is filled with fill control characters and supplied to PCS3. Block 28 is filled with data from packet PN in normal fashion, as the accumulation of idle characters in the MAC data stream has now been compensated.

At the next block time, data blocks are once again supplied to PCS2 and PCS3 (blocks 30 and 31, as shown). All blocks in the remainder of the frame can contain data, unless the APL decides to compensate for another IPG deficit. Although this example shows a single extended IPG, this method can also be used to compensate for an accumulation of smaller IPGs discarded from the MAC data stream. For instance, the APL can keep a running total of the IPG octets discarded from the MAC data stream. When this total exceeds, by some threshold, the cumulative number of IPG octets that the APL is planning to send to the PHYs at the end of the current frame, the APL can trigger the generation of a short block and/or one or more blank blocks.

FIG. 7 illustrates additional details for the generation of a short block. Packet M is followed in the MAC data stream by an extended IPG that triggers the generation of a short block. The APL forms a block XN+1, consisting of the remaining octets of packet M, a terminate control character for packet M, and fill control characters, for a total of 64 octets. The fill control characters are any character or character alternation that can be distinguished as such by the APL receiver, and that will not be consumed or replicated by one or more of the PHYs.

The remainder of the extended IPG is mapped to the beginning of a short block XN+2, as another group of fill control characters. When the APL determines that it has enough data to begin transmitting packet N, the APL terminates the fill control character sequence with a packet N start octet, followed by packet N data.

The transmit APL follows the short block/fill character sequence on PCS1 with a start block, (X+1)N+1. The receive APL senses the use of a character other than a fill control character to realign data from that PHY1 with data received on the other PHYs of the aggregation.

A blank block (such as block 27 of FIG. 6) follows the format of FIG. 7 short block XN+1, but contains no data, e.g., 64 fill control characters. A short block may also contain a packet termination, some number of fill characters, and the start of a new packet.

An alternate method for compensating for idle character deficits is to terminate an entire frame prematurely. As it cannot be guaranteed that a MAC will stop supplying packet data at the end of an integer number of APL frames, the general method follows the example shown in FIGS. 8 and 9.

FIG. 8 shows a MAC data stream comprising two packets PR and PS, separated by a large IPG. After the APL process has distributed packet PR to frame i blocks 60, 61, 62, and short block 63, the APL process becomes starved of packet data. It generates a blank block 64 to finish the block time for PCS1-PCS4. Rather than generate a blank block 65 for PCS1, however, the APL process chooses to simply terminate the frame early. The APL process accomplishes this by supplying at least n idle control characters to all PHYs, where n is greater than or equal to the number of idle characters required between frames by the PHYs. The APL receiver senses the reception of idle characters on all PHYs as an early frame termination, and resets its counters appropriately while waiting for start blocks from the PHYs. The sending APL process can continue to send idle control characters on all PHYs until the MAC finally supplies a new packet PS.

FIG. 9 shows the details of an early frame termination, including the timing of the terminate control character for the last packet R, fill control characters to complete the current block, idle control characters, and start blocks on all PHYs. Like with any IPG, the relative timing of the PHY data received at the receiver APL process may skew slightly as idle control characters are inserted or deleted by the PHYs. The receiver APL thus performs a frame deskew upon receiving the start blocks such that all are in alignment.

The receiver APL reverses the multiplexing process performed by the sending APL. The start control characters, terminate control characters, idle control characters, and fill control characters inserted by the sending APL are removed (the start characters are actually converted back to preamble characters), and the data blocks are concatenated by taking them from each PHY is round-robin order. The receiver APL detects the locations of packet boundaries in the concatenated packet stream from the start and control characters, after demultiplexing the data received from the N PHYs. Appropriate IPGs are inserted between the packets, and the packets are passed through the reconciliation layer to the receive MAC.

Figure 10:
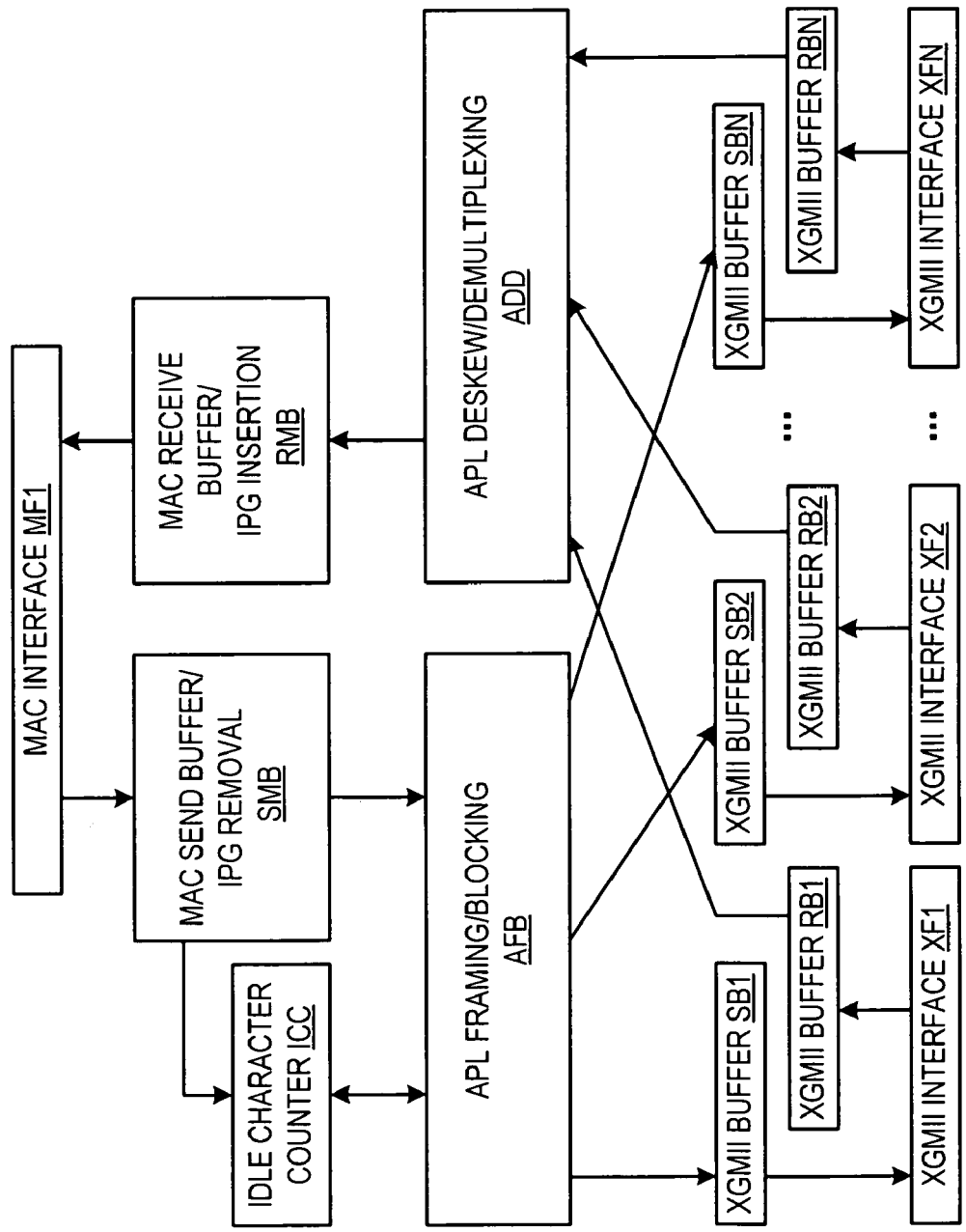
FIG. 10 contains a block diagram for an APL embodiment.

FIG. 10 contains a block diagram for APL according to an embodiment. The APL comprises a MAC interface MF1, a MAC send buffer/IPG removal SMB, an idle character counter ICC, APL framing/blocking logic AFB, N XGMII send buffers SB1, SB2, . . . , SBN, N XGMII receive buffers RB1, RB2, . . . , RBN, N XGMII interfaces XF1, XF2, . . . , XFN, APL deskew/demultiplexing logic ADD, and a MAC receive buffer/IPG insertion RMB.

On the send side of the APL, the MAC interface MF1 stores the MAC data stream in the MAC send buffer/IPG removal SMB. The buffer discards idle control characters, and increments the idle character counter ICC each time it does so. The APL framing/blocking AFB decrements the ICC when it inserts terminate, idle, and fill control characters in any of the SGMII send buffers, and reads the ICC to determine whether to send short blocks. The APL framing/blocking logic AFB also terminates frames early if the MAC send buffer is emptied. Thus logic AFB sends start, terminate, fill, and idle characters to each XGMII send buffer, and distributes packet data from the MAC send buffer to each XGMII send buffer, as previously described.

Each XGMII send buffer has a buffer depth at least equal to N times the block size, to allow logic AFB to distribute N blocks of data to the different buffers for synchronous transmission out the XGMII interfaces.

On the receive size, each XGMII interface supplies data from a PHY to a corresponding XGMII receive buffer. Each XGMII receive buffer has a buffer depth at least equal to N times the block size, to allow logic ADD time to visit each buffer in round-robin fashion.

APL deskewing/demultiplexing logic ADD aligns the frame start blocks from each XGMII receive buffer, and then takes 64 bytes from each XGMII receive buffer in round-robin fashion. Logic ADD also senses short and blank blocks and discards idle/fill control characters. Logic ADD also senses early frame termination by tracking the onset of idle character transmission on multiple PHYs.

MAC receive buffer/IPG insertion logic RMB receives the concatenated packet data stream produced by the APL deskew/demultiplexing logic ADD. Buffer/logic RMB locates packet boundaries from the start and termination control characters. The start characters are replaced with a preamble character, and the termination characters are removed. Buffer/logic RMB inserts IPGs at the packet boundaries, such that a continuous stream of packet data/IPGs is produced to the MAC interface MF1.

Figure 11:
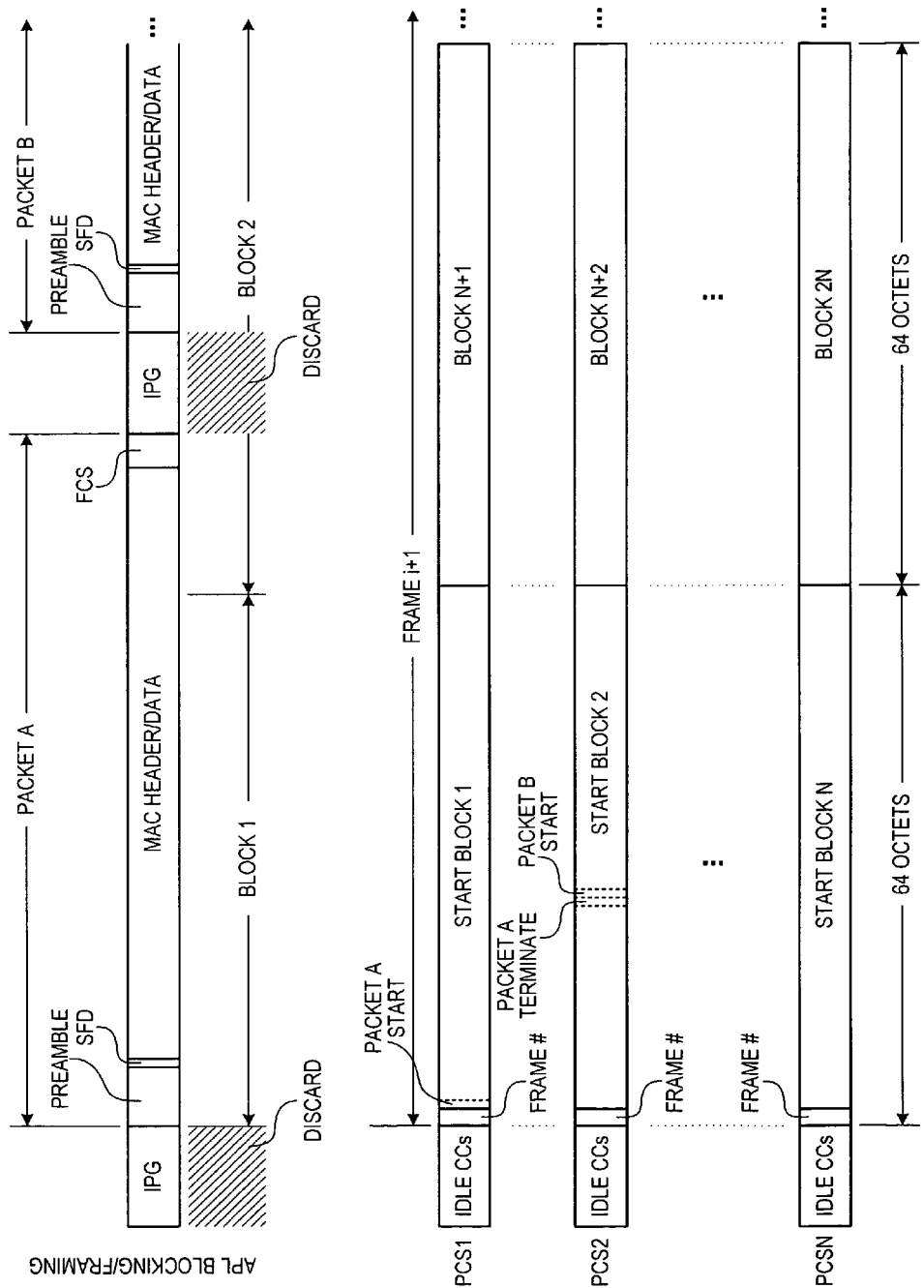
FIG. 11 shows transmission details at the start of a frame for an embodiment that transmits frame numbers.

In the above examples, it is assumed that by controlling the transmission timing of start blocks to the sending PHYs, the receiving APL will receive data for a given frame on each PHY with only minor timing variations. As skew tolerance is relaxed, receive buffer depth increases. In an extreme case, and depending on frame length, it may be possible that different PHYs may be receiving the same frame skewed by more than one-half frame time, resulting in ambiguity at the receiving APL. The FIG. 11 embodiment addresses this case by modifying the start block format to include a frame number. In other words, one or more octets at the beginning of each start block are dedicated to sending a frame number to be interpreted by the receiving APL. The frame number can be the same number for each PHY in a given frame, and increment once per frame, or can increment for each lane in round-robin order, such that a given lane transmits frame numbers numerically separated by N. The receiving APL interprets and removes the frame numbers, using them to check that all lanes are in alignment.

Those skilled in the art will appreciate that the embodiments and/or various features of the embodiments can be combined in other ways than those described. For instance, although 64-octet blocks, 32-block frames, 2 kbyte frame lengths, and 10 Gbit PHYs have been used in the embodiments, these are merely exemplary. Likewise, references to XGMII MAC/PHY interfaces are exemplary, and these may be replaced in an implementation by XGXS/XAUI (XGMII eXtender Sublayer/10 Gigabit eXtended Attachment Unit Interface) MAC/PHY interfaces, or some other interface.

The APL process has been described without reference to one multiplexing/buffering approach. With the processes described above, those of ordinary skill in the art will find that other approaches are applicable in certain embodiments.

Although the specification may refer to "an", "one", "another", or "some" embodiment(s) in several locations, this does not necessarily mean that each such reference is to the same embodiment(s), or that the feature only applies to a single embodiment.

What is claimed is:

1. A method of transmitting packet data, the method comprising:
   dividing a packet data stream into sequential packet data blocks, each packet data block is comprised of multiple packet data symbols, each packet data symbol is comprised of multiple bits;
   removing interpacket gap symbols appearing in the packet data stream, tracking the net number of interpacket gap symbols removed from the packet data stream and not accounted for by adding characters to the parallel packet data substreams that did not appear in the packet data stream, and compensating for the net number of interpacket gap symbols removed by adding fill control characters following the end of a packet in a packet data block;
   distributing the sequential packet data blocks among a plurality of parallel packet data substreams;
   concatenating, among the plurality of parallel packet data substreams, multiple packet data blocks into a data frame without block delimiters; and
   sending the concatenated data frame to a corresponding physical layer coder, each data frame concatenated among the plurality of parallel packet data substreams is delimited from a neighboring data frame by a control character sequence comprised of interpacket gap characters included in each of the parallel data frame substreams.

2. The method of claim 1, wherein sending data frames from each parallel packet data substream to a corresponding physical layer coder comprises sending data frames to all physical layer coders at substantially the same time.

3. The method of claim 1, wherein each frame further comprises a frame number.

4. The method of claim 1, wherein packets in the packet data stream each comprise a packet preamble, and wherein dividing a packet data stream further comprises replacing at least one character in the packet preamble of each packet in the packet data stream with a packet start character.

5. The method of claim 4, wherein dividing a packet data stream further comprises adding a packet terminate character at the end of each packet in the packet data stream.

6. The method of claim 1, further comprising compensating for the net number of interpacket gap symbols removed by adding fill control characters to the beginning of a packet data block.

7. The method of claim 1, wherein a standard frame length comprises a fixed number of fixed-length packet data blocks, the method further comprising compensating for the net number of interpacket gap symbols removed by terminating the frame prior to the standard frame length by transmitting, after a number of blocks less than the fixed number, control character sequences in all packet data substreams.

8. A physical layer aggregator comprising:
a first packet data interface having a first line rate;
a plurality of similar second packet data interfaces, having an aggregate line rate substantially equivalent to the first line rate;
a framing and blocking logic unit;
a first send buffer to receive packet data from the first packet data interface, to remove interpacket gap characters from the packet data received from the first packet data interface and mark packet endpoints with designated control characters, and supply packet data to the framing and blocking logic unit;
an idle character counter in communication with the first send buffer and the framing and blocking logic unit, the idle character counter tracking the net number of interpacket gap characters removed from the packet data supplied from the first packet data interface and not compensated for by other characters inserted in the packet data supplied to a plurality of second send buffers; and
the plurality of second send buffers to receive packet data from the framing and blocking logic unit and supply packet data to respective ones of the second packet data interfaces;
the framing and blocking logic unit dividing packet data from the first send buffer into sequential packet data blocks and distributing those packet data blocks to the plurality of second send buffers, the framing and blocking unit formatting the packet data blocks distributed to each of the plurality of second send buffers into data frames, each data frame is comprised of multiple packet data blocks concatenated in the plurality of second send buffers for transmission over respective second packet data interfaces, and delineating successive data frames from each other data frame in the buffer with a sequence of interpacket gap characters, wherein temporally corresponding data frames in the plurality of second send buffers are all of the same length.

9. The physical layer aggregator of claim 8, the framing and blocking logic unit compensating for a net removal of interpacket gap characters by inserting fill control characters, different from the interpacket gap characters, into at least one of the packet data blocks distributed to the plurality of second send buffers.

10. The physical layer aggregator of claim 8, the framing and blocking logic unit compensating for a net removal of interpacket gap characters by terminating all current frames after the current block of each current frame for each of the plurality of second send buffers.

11. The physical layer aggregator of claim 8, further comprising:
a deskew and demultiplexing logic unit;
a first receive buffer to receive packet data from the deskew and demultiplexing logic unit and supply packet data to the first packet data interface;
a plurality of second receive buffers to receive packet data from respective ones of the second packet data interfaces and supply packet data to the deskew and demultiplexing logic unit, the packet data comprising data frames of fixed-length packet data blocks, wherein successive data frames received by each second receive buffer are separated by interpacket gap control character sequences;
the deskew and demultiplexing logic unit sensing frame boundaries in the packet data received from each second receive buffer and using sensed frame boundary information to align, with each other, data frames from the second receive buffers, the deskew and demultiplexing logic unit demultiplexing packet data blocks from the aligned data frames into a packet data stream supplied to the first receive buffer.

12. The physical layer aggregator of claim 11, wherein the first receive buffer detects packet delimiter control characters in its received packet data stream and replaces the packet delimiter control characters with interpacket gap control characters, packet preamble characters, or combinations of interpacket gap control characters and packet preamble characters.

* * * * *